(12) United States Patent
Tomioka

(10) Patent No.: US 6,736,872 B2
(45) Date of Patent: May 18, 2004

(54) GAS COLLECTING METHOD AND GAS COLLECTING APPARATUS

(75) Inventor: Yuki Tomioka, Sayama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/234,848

(22) Filed: Sep. 5, 2002

(65) Prior Publication Data
US 2003/0079450 A1 May 1, 2003

(30) Foreign Application Priority Data
Oct. 30, 2001 (JP) ........................................ 2001-333056

(51) Int. Cl.[7] ............................................. B01D 50/00
(52) U.S. Cl. .................. 55/385.6; 55/385.1; 360/97.03; 360/97.02; 360/97.04; 361/688; 361/690; 361/692; 361/694
(58) Field of Search ............................. 55/385.1, 385.6; 360/97.02, 97.03, 97.04; 361/688, 690, 692, 694

(56) References Cited

U.S. PATENT DOCUMENTS

| | | | |
|---|---|---|---|
| 5,593,482 A | * 1/1997 | Dauber et al. ................. | 96/135 |
| 5,734,521 A | * 3/1998 | Fukudome et al. ....... | 360/97.03 |
| 5,827,424 A | 10/1998 | Gillis et al. | |
| 5,997,614 A | * 12/1999 | Tuma et al. ................ | 55/385.6 |
| 5,997,618 A | * 12/1999 | Schneider et al. ............. | 96/135 |
| 6,077,335 A | * 6/2000 | Schneider et al. ............. | 96/135 |
| 6,108,164 A | * 8/2000 | Weber, Jr. ................. | 360/97.02 |
| 6,205,845 B1 | 3/2001 | Dinsmore et al. | |
| 6,214,095 B1 | * 4/2001 | Logan et al. .................. | 96/147 |
| 6,382,500 B1 | * 5/2002 | Master et al. ............ | 228/180.1 |
| 6,456,454 B1 | * 9/2002 | Slezak ..................... | 360/97.03 |

FOREIGN PATENT DOCUMENTS

| | | |
|---|---|---|
| JP | 5-346417 | 12/1993 |
| JP | 6-138093 | 5/1994 |
| JP | 7-211052 | 8/1995 |
| JP | 11-242872 | 9/1999 |
| JP | 2000-251445 | 9/2000 |

* cited by examiner

Primary Examiner—Minh-Chau T. Pham
(74) Attorney, Agent, or Firm—Pillsbury Winthrop LLP

(57) ABSTRACT

A disk apparatus having an open inner structure and a collector liquid, which are housed in a hermetically sealed collecting container, are heated to a certain collecting temperature by a heating mechanism so as to permit a gas to be generated from the disk apparatus and to evaporate the collector liquid. The vapor of the collector liquid brings into contact with the disk apparatus and collects the gas generated from the disk apparatus and, then, the collecting container is cooled so as to liquefy the vapor that has collected the gas generated from the disk apparatus.

7 Claims, 3 Drawing Sheets

Analytical result of collected gas  [Unit : ng / drive]

|      | Example 1 | Example 2 |
|------|-----------|-----------|
| Cl   | 3         | 5         |
| NOx  | 50        | 55        |
| SOx  | 15        | 8         |
| Na   | 5         | 18        |
| K    | 12        | 22        |
| NH4  | 40        | 44        |
| Cr   | 6         | 3         |
| Ni   | ND        | ND        |
| Fe   | ND        | ND        |

GAS COLLECTING METHOD AND GAS COLLECTING APPARATUS

CROSS-REFERENCE TO RELATED APPLICATIONS

This application is based upon and claims the benefit of priority from the prior Japanese Patent Application No. 2001-333056, filed Oct. 30, 2001, the entire contents of which are incorporated herein by reference.

BACKGROUND OF THE INVENTION

1. Field of the Invention

The present invention relates to a gas collecting method and a gas collecting apparatus for collecting the gases generated during operation of a disk apparatus, particularly, to a gas collecting method and a gas collecting apparatus for quantitatively evaluating a corrosive gas generated within a disk apparatus.

2. Description of the Related Art

In general, a disk apparatus, e.g., a hard disk drive (hereinafter referred to as "HDD"), comprises a magnetic disk, a spindle motor for rotating the magnetic disk, a magnetic head for reading/writing data relative to the magnetic disk, a head suspension assembly for supporting and moving the magnetic head, and a VCM (voice coil motor) for driving the head suspension assembly. These members of the disk apparatus are housed in a case of a substantially hermetic structure. If a hermetic case is used, it is possible to stabilize the floating operation of the magnetic head relative to the magnetic disk during the read/write operation. It is also possible to prevent dust, etc., from entering the case.

It is possible for the members of the HDD to include a member that generates a harmful gas, particularly, a corrosive gas, depending on changes in, for example, temperature or humidity. Where a corrosive gas is generated within the case in an HDD of the hermetic structure referred to above, the corrosive gas is ionized and adsorbed on the members of the HDD, giving rise to the problem that the HDD members are corroded. Under the circumstances, it is desirable to detect which member generates a corrosive gas and to change the material of the member generating the corrosive gas.

Such being the situation, it was customary in the past to improve the reliability of an HDD by collecting and analyzing the gas generated from the constituting member inside the HDD so as to evaluate in advance whether a member generating a harmful gas is present in the constituting members of the HDD.

A gas flow type gas collecting method and a gas collecting apparatus are disclosed in, for example, Japanese Patent Disclosure (Kokai) No. 7-211052 as a method and apparatus for collecting the gas generated from the HDD. The apparatus disclosed in this document is constructed such that a dry gas, which is used for collecting the generated gas, is supplied from a gas supply device into an HDD placed in a gas collecting device, then a gas component generated from the HDD is collected together with the dry gas in the gas collecting device, and then the collected gas is supplied into an analytical apparatus so as to analyze the collected gas.

However, the gas flow type collecting apparatus described above is defective in that the entire apparatus is bulky and that the working efficiency is low. It should also be noted that the collecting apparatus collects and analyzes the gas component generated under normal humidity or when humidified under a low humidity environment. However, the disorders caused by the gas generated within the HDD are not limited to those generated under normal humidity or under a low humidity environment. It is possible for the disorders in question to be generated under a high humidity environment. The gas generated from within the HDD under a high humidity environment reacts with water so as to be ionized. It is difficult to collect and analyze the ionized gas by the dry gas type collector, an activated carbon gas collector or a gas chromatography mass analyzer.

Such being the situation, it is conceivable to flow a wet gas in a gas flow type gas collecting apparatus so as to collect the gas generated from the HDD. In this case, however, a large scale facility is required for the preparation of the wet gas, and it is necessary to use a material having a high corrosion resistance for forming the gas collecting apparatus. In addition, condensation tends to be generated because of the difference between the gas temperature and the HDD temperature, which makes it difficult to recover the collected gas component.

BRIEF SUMMARY OF THE INVENTION

The present invention has been contrived in consideration of above circumstances, and its object is to provide a gas collecting method and a gas collecting apparatus, which permit collecting easily and efficiently the gas generated from within a disk apparatus and which also permit quantitatively analyzing the collected gas.

According to an aspect of the present invention, which is intended to achieve the object described above, there is provided a gas collecting method for collecting the gas generated from within a disk apparatus, comprising housing a disk apparatus having an open inner structure and a collector liquid in a hermetically sealed collecting container; heating the disk apparatus and the collector liquid to a certain collecting temperature so as to permit a gas to be generated from the disk apparatus and to evaporate the collector liquid; bringing the vapor of the collector liquid into contact with the magnetic disk apparatus so as to collect the gas generated from the disk apparatus; lowering the temperature of the collecting container so as to liquefy the vapor collecting the generated gas.

According to another aspect of the present invention, there is provided a gas collecting apparatus, comprising a hermetically sealed collecting container housing a disk apparatus having an open inner structure and a collector liquid; and a heating mechanism configured to heat the disk apparatus and the collector liquid to a certain collecting temperature so as to permit a gas to be generated from the disk apparatus and to evaporate the collector liquid, the vapor of the collector liquid being brought into contact with the disk apparatus so as to collect the gas generated from the disk apparatus.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the present invention, and together with the general description given above and the detailed description of the embodiments given below, serve to explain the principles of the present invention.

DETAILED DESCRIPTION OF THE INVENTION

A gas collecting method and a gas collecting apparatus according to an embodiment of the present invention will now be described in detail with reference to the accompanying drawings.

Figure 1:
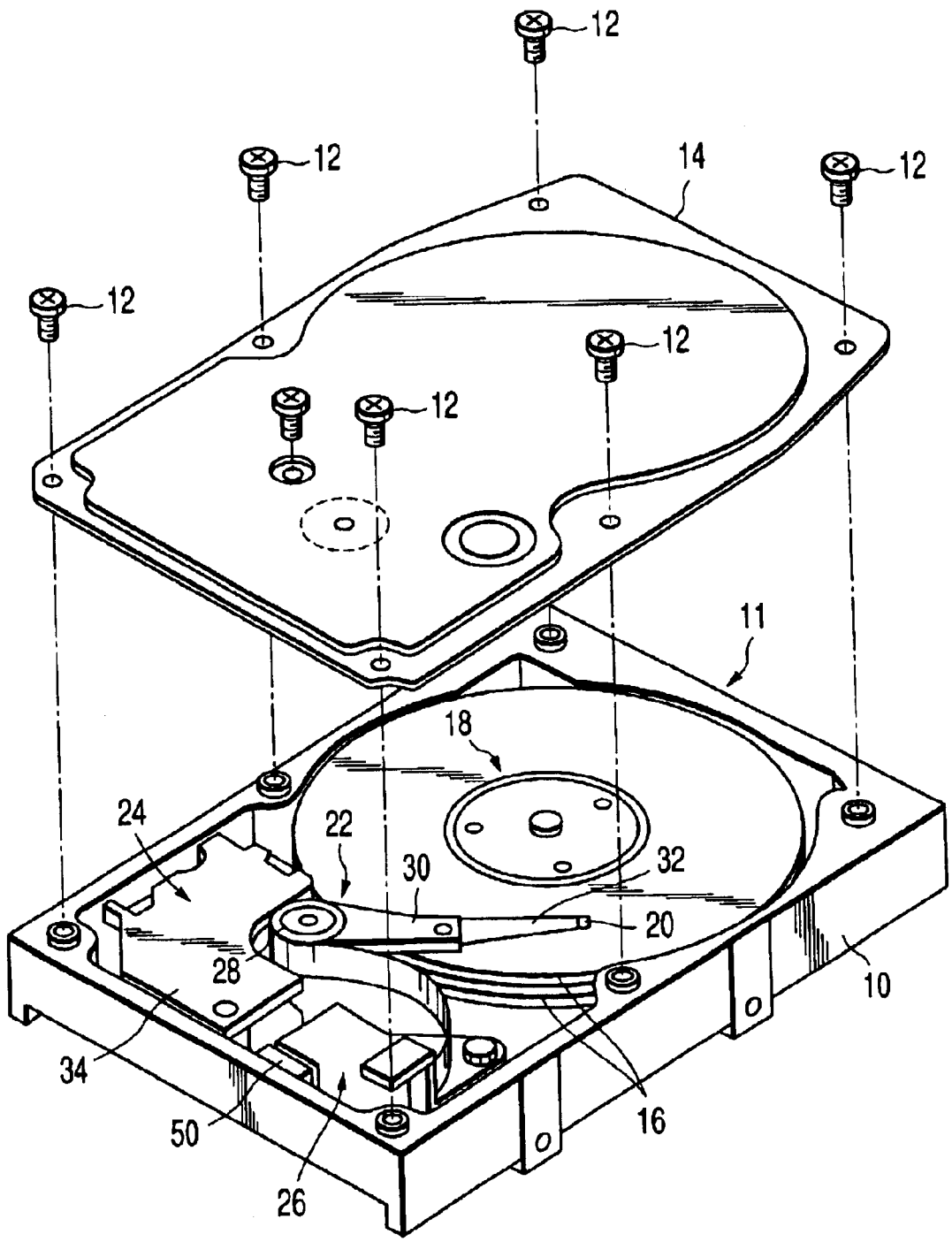
FIG. 1 is an exploded perspective showing an HDD that is to be examined.

An example of an HDD that is to be examined will now be described first. As shown in FIG. 1, the HDD comprises a case 11 of a substantially hermetic structure including a case body 10 and a top cover 14. The case body 10 is in the form of a rectangular box having an opened top, and the top cover 14 is screwed to the case body 10 by a plurality of screws 12 and closes the opened top of the case body 10.

Housed in the case body 10 are, for example, two magnetic disks 16 each used as a magnetic recording medium, a spindle motor 18 for supporting and rotating these magnetic disks 16, a plurality of magnetic heads 20 for performing reading/writing of information relative to the magnetic disks 16, a carriage assembly 22 supporting these magnetic heads 20, a voice coil motor (VCM) 24 for rotating and positioning the carriage assembly 22, and a board unit 26 provided with a pre-amplifier and the like.

A printed circuit board (not shown) is screwed to the outer surface of the bottom wall of the case body 10. A DRAM, a hard disk controller (HDC), a servo control circuit, etc., are mounted on the printed circuit board so as to control the operations of the spindle motor 18, the VCM 24 and the magnetic heads 20.

The carriage assembly 22 includes a substantially cylindrical bearing assembly 28 fixed to the bottom wall of the case body 10 and four sets of head suspension assemblies rotatably supported by the bearing assembly 28. Each of the head suspension assemblies includes an arm 30 extending from the bearing assembly 28 toward the magnetic disk 16 and an elongated suspension 32 fixed to the distal end of the arm 30. The magnetic head 20 is mounted on the extended end portion of the suspension 32 via a slider (not shown).

The four sets of head suspension assemblies are arranged such that two magnetic heads 20 face each other with the magnetic disk 16 interposed there-between. It follows that, by the rotation of the carriage assembly 22 about the bearing assembly 28, each magnetic head 20 is capable of movement onto an optional track on the corresponding magnetic disk 16.

The VCM 24 includes a pair of yokes 34 fixed to the bottom wall of the case body 10, a permanent magnet (not shown) fixed to the inner surface of one of the yokes, and a voice coil (not shown) fixed to the carriage assembly 22 and movable between one of the yokes and the permanent magnet. A magnetic field is generated if an electric power is supplied to the voice coil, and the carriage assembly 22 is rotated by the interaction between the magnetic field generated from the voice coil and the magnetic field generated from the permanent magnet.

In the HDD of the construction described above, the constituting member made of a metal is formed of steel material in view of physical strength and the workability. It is possible for the metallic constituting member of the HDD to contain a corrosive component as an impurity.

Figure 2:
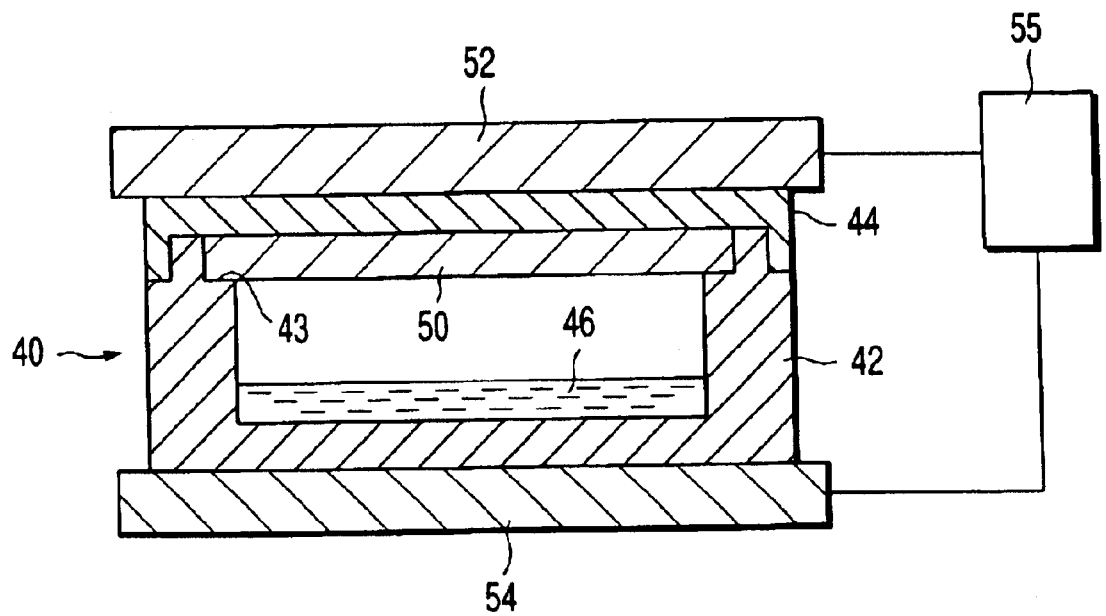
FIG. 2 is a cross sectional view showing the construction of a gas collecting apparatus according to a first embodiment of the present invention.

A gas collecting apparatus for collecting and analyzing the gas generated from within the HDD of the construction described above will now be described with reference to FIG. 2. The gas collecting apparatus according to a first embodiment of the present invention comprises a collecting container 40 formed of Teflon (trade name). The collecting container 40 is of a substantially hermetic structure and includes a container body 42 and a lid body 44. The container body 42 is in the form of a rectangular box having an upper opening, and the lid body 44 is detachably mounted to the container body 42 so as to hermetically seal the upper opening of the container body 42. A mounting section 43 for mounting an HDD is formed in the upper opening of the container body 42.

An HDD 50 that is to be examined and pure water serving as a collector liquid 46 are housed in the collecting container 40. The HDD 50 is mounted to the container body 42 under the state that the top cover is detached therefrom, i.e., under the state that the inner structure of the HDD 50 is open to the outside. Particularly, the HDD 50 is mounted to the mounting section 43 under the state that the opened top of the case body 11 of the HDD 50 faces downward, and the HDD 50 is held substantially horizontal. The collector liquid 46 is accumulated on the bottom of the container body 42 and positioned below the HDD 50.

The gas collecting apparatus comprises a heating mechanism which includes a first heating plate 52 disposed on the upper surface of the lid body 44 so as to heat the HDD 50, a second heating plate 54 disposed on the outer surface of the bottom wall of the container body 42 so as to heat the collector liquid 46, and a control section 55 for controlling the heat generating temperatures of the first and second heating plates 52 and 54. Incidentally, the first and second heating plates 52 and 54 perform the function of a heating section.

The gas generated from within the HDD 50 under a high temperature and a high humidity is collected by using the gas collecting apparatus of the construction described above. In this case, the HDD 50 and the collector liquid 46 are heated to a certain collecting temperature while controlling the temperatures of the first and second heating plates 52 and 54 by the control section 55 so as to permit a gas to be generated from within the HDD and to evaporate the collector liquid 46.

Figure 3:
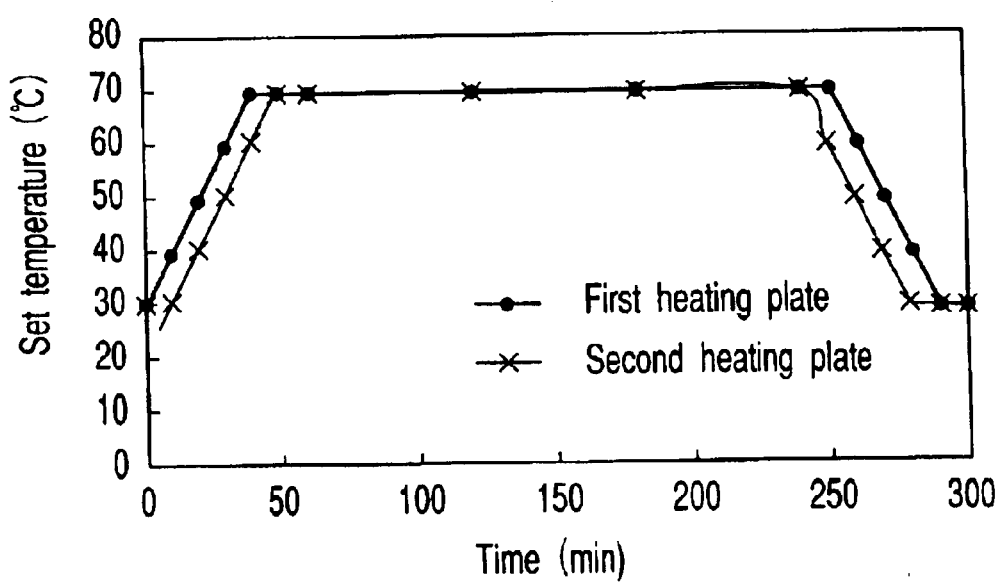
FIG. 3 is a graph showing the changes with time in temperatures of the first and second heat generating plates of the gas collecting apparatus during collecting operation.

For example, the HDD 50 and the collector liquid 46 are heated to a collecting temperature of 70° C., which is the evaporating temperature of pure water. In the temperature elevation process, the HDD 50 and the collector liquid 46 are heated to the collecting temperature with the temperature of the HDD 50 being held higher by a predetermined temperature, e.g., +10° C., than the temperature of the collector liquid 46, as shown in FIG. 3. Naturally, the collector liquid 46 is heated to the collecting temperature a certain amount of time after the HDD 50 is heated to the collecting temperature.

Both the HDD 50 and the collector liquid 46 are maintained at the collecting temperature for a certain time, e.g., for about 2 hours. As a result, a gas is generated from the constituting members inside the HDD 50 and, at the same time, the collector liquid 46 is evaporated under the high temperature and high humidity environment. The vapor of the collector liquid 46 is brought into contact with the constituting members inside the HDD 50 and collects the gas component generated from the constituting members.

Then, a certain time later, the temperatures of the first and second heating plates 52 and 54 are lowered to room temperature by operating the control section 55. As a result, the temperature of the HDD 50 is also lowered to room temperature, and the vapor of the collecting liquid 46, which has collected the gas generated from the HDD 50, is liquefied and brought back to the collecting liquid 46.

In the temperature lowering process, the temperatures of the first and second heating plates 52 and 54 are controlled so as to keep the temperature of the HDD 50 higher by a certain temperature, e.g., by +10° C., than the temperature of the collector liquid 46, as shown in FIG. 3. Naturally, the HDD 50 is cooled to reach room temperature a certain amount of time after the collector liquid 46 is cooled to reach room temperature.

As described above, the temperature of the HDD 50 is kept higher than the temperature of the collector liquid 46 in each of the temperature elevation process and the temperature lowering process, with the result that the evaporated collector liquid 46 is prevented from forming condensation on the surfaces of the constituting members of the HDD. Incidentally, it is desirable for the temperature difference between the HDD 50 and the collector liquid 46 to be maintained at about 10° C. to 30° C. in view of the difference in the thermal conductivity between the metal or the glass material and the aqueous solution.

By the processes described above, it is possible to collect the gas component generated from within the HDD 50 under a high temperature and high humidity environment in the collector liquid 46. Then, the collector liquid 46 is taken out by opening the lid body 44 of the collecting container 40 and then the gas component contained in the collector liquid 46 is analyzed by an ICP-AES (plasma induction type light emitting apparatus), an ICP-MS (plasma induction type light emission-mass spectrometric apparatus), or an IC (ion chromatography).

Figures 4, 5:
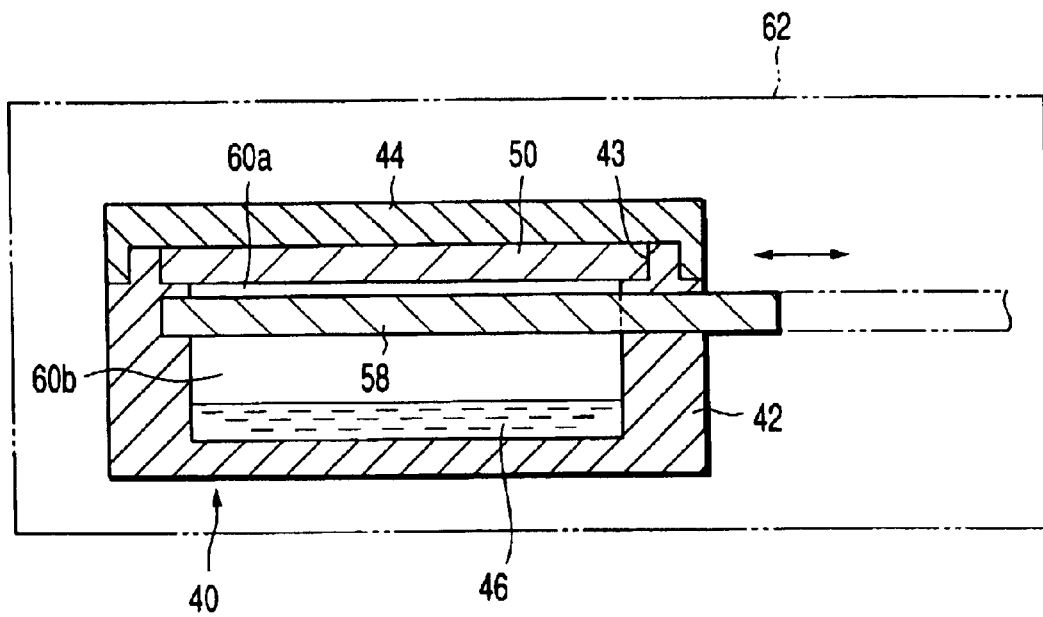
FIG. 4 is a table showing the analytical results of the gases collected by the gas collecting apparatus.
FIG. 5 is a cross sectional view showing the construction of the gas collecting apparatus according to a second embodiment of the present invention.

FIG. 4 is a table showing the analytical results of the collected gases for Example 1. The experimental data support that nitrate ions were generated within the HDD 50 under the high temperature and high humidity environment.

According to the gas collecting apparatus and the gas collecting method described above, it is possible to collect easily and efficiently the gas components generated from within the HDD under a high temperature and high humidity environment and to evaluate the collected gas components quantitatively. Also, in the gas collecting process, it is possible to prevent condensation formation and collect the gas generated from within the HDD without fail.

In the embodiment described above, a single collecting container is heated by the first and second heating plates so as to collect the gas components generated from within the HDD. Alternatively, it is also possible to control simultaneously the temperature elevation and the temperature drop of a plurality of collecting containers each housing a HDD and the collector liquid by using first and second large heating plates so as to collect the gas components from the plural HDD apparatuses by a single operation.

A gas collecting apparatus and a gas collecting method according to a second embodiment of the present invention will now be described with reference to FIG. 5. The gas collecting apparatus according to the second embodiment comprises a collecting container 40. The collecting container 40 includes a container body 42 and a lid body 44 and is of a substantially hermetic structure. The container body 42 is in the form of a rectangular box having an upper opening, and the lid body 44 is detachably mounted to the container body 42 so as to hermetically seal the upper opening of the container body 42. A mounting section 43 for mounting an HDD 50 is formed in the upper opening of the container body 42.

Housed in the collecting container 40 are the HDD 50 and pure water used as the collector liquid 46. The HDD 50 is mounted to the container body 42 under the state that the top cover is detached therefrom, i.e., under the state that the inner structure of the HDD 50 is open to the outside. Particularly, the HDD 50 is mounted to the mounting section 43 under the state that the opened top of the case body of the HDD 50 faces downward, and the HDD 50 is held substantially horizontal. The collector liquid 46 is accumulated on the bottom of the container body 42 and positioned below the HDD 50.

The collecting container 40 includes a partition plate 58 in addition to the container body 42 and the lid body 44. The partition plate 58 is arranged slidable in the horizontal direction relative to the container body 42 between the partitioning position shown in FIG. 5 and the release position to which the partition plate 58 is withdrawn from the container body 42 except one end portion of the partition plate 58. The partition plate 58 in the partitioning position serves to partition the inner space of the collecting container 40 into a first region 60a in which is housed the HDD 50 and a second region 60b in which is housed the collector liquid 46. If the partition plate 58 is moved from the partitioning position to the release position, the partitioning between the first region 60a and the second region 60b is eliminated so as to allow the first and second regions 60a and 60b to communicate with each other.

The gas collecting apparatus of the construction described above is used for collecting the gas components generated from within the HDD 50 under a high temperature and high humidity environment. In this case, the collector liquid 46 and the HDD 50 are housed in the container body 42 of the collecting container 40. Then, the partition plate 58 is set to the partitioning position so as to partition the collector liquid 46 from the HDD 50, followed by mounting the lid body 44 so as to hermetically seal the collecting container 40.

Under the state described above, the entire collecting container 40 is put into a constant temperature bath 62 heated to the collecting temperature of 70° C. and left to stand until it reaches 70° C. As a result, the HDD 50 arranged within the collecting container 40 is heated to the collecting temperature so as to permit gas components to be generated from within the HDD and, at the same time, to evaporate the collector liquid 46. Incidentally, the constant temperature bath 62 performs the function of a heating mechanism.

Consequently, the partition plate 58 is moved to the release position so as to eliminate the partitioning between the first and second regions 60a and 60b, thereby allowing the vapor of the collector liquid 46 to be brought into contact with the HDD 50. This state is maintained for 2 hours or more so as to allow the vapor of the collector liquid 46 to collect the gas components generated from within the HDD 50 under a high temperature and high humidity environment. Then, the partition plate 58 is moved again back to the partitioning position so as to partition the first and second regions 60a and 60b from each other, followed by lowering the temperature of the entire collecting container 40 to room temperature. As a result, the temperature of the HDD 50 is also lowered to room temperature. The vapor of the collector liquid 46 collecting the gas components generated from within the HDD 50 is liquefied and brought back into the collector liquid 46.

By the processes described above, it is possible to collect the gas component generated from within the HDD 50 under a high temperature and high humidity environment in the collector liquid 46. After the collector liquid 46 reaches to room temperature, it is taken out by opening the lid body 44 of the collecting container 40 and by moving the partition plate 58 to the release position. Then, the gas component contained in the collector liquid 46 is analyzed by an ICP-AES (plasma induction type light emitting apparatus), an ICP-MS (plasma induction type light emission-mass spectrometric apparatus), or an IC (ion chromatography).

The analytical result is shown in the table of FIG. 4 as Example 2. The experimental data support that nitrate ions were generated within the HDD 50 under the high temperature and high humidity environment.

According to the gas collecting apparatus and the gas collecting method of the construction described above, it is possible to collect easily and efficiently the gas components generated from within the HDD under a high temperature and high humidity environment and to evaluate the collected gas components quantitatively. In the gas collecting process, it is possible to prevent the condensation within the HDD because the temperature is elevated or dropped under the state that the inner space of the collecting container 40 is partitioned by the partition plate 58 into the first region 60a and the second region 60b, with the result that it is possible to collect the gas components generated from within the HDD without fail.

Incidentally, in the second embodiment, it is possible to put a plurality of collecting containers each housing an HDD and the collector liquid in a large constant temperature bath so as to heat or cool the HDD and the collector liquid simultaneously. In this case, it is possible to collect the gas components generated from a plurality of HDD apparatuses in a single operation.

Additional advantages and modifications will readily occur to those skilled in the art. Therefore, the present invention in its broader aspects is not limited to the specific details and representative embodiments shown and described herein. Accordingly, various modifications may be made without departing from the spirit or scope of the general inventive concept as defined by the appended claims and their equivalents.

For example, the collector liquid used is not limited to pure water. It is possible to select various collector liquids depending on the kind of the gas component that is to be collected. For example, an acidic solution, an alkaline solution, an organic solvent or the like may be used as the collector liquid. Also, the collecting temperature, the collecting time, etc. can be selected appropriately, as required. Further, the arrangement of the disk apparatus within the collecting container is not limited to a horizontal arrangement. For example, the disk apparatus can be arranged oblique within the collecting container. It is possible to apply the technical idea of the present invention to not only the magnetic disk apparatus but also other disk apparatuses such as a photomagnetic disk apparatus.

What is claimed is:

1. A gas collecting method for collecting the gas generated from within a disk apparatus, comprising:

housing a disk apparatus having an open inner structure and a collector liquid in a hermetically sealed collecting container;

heating the disk apparatus and the collector liquid to a certain collecting temperature so as to permit a gas to be generated from the disk apparatus and to evaporate the collector liquid under the state that the inner space of the collecting container is partitioned into a first region in which is arranged the disk apparatus and a second region in which is arranged the collector liquid;

releasing the partitioning between the first region and the second region and maintaining the disk apparatus and the collector liquid at the collecting temperature for a certain time, thereby bringing the vapor of the collector liquid into contact with the disk apparatus so as to collect the gas generated from the disk apparatus;

lowering the temperature of the disk apparatus and the collector liquid, with the inner space of the collecting container being partitioned again into the first and second regions, so as to liquefy the vapor collecting the generated gas.

2. The gas collecting method according to claim 1, wherein the disk apparatus and the collector liquid are heated to the collecting temperature with the temperature of the disk apparatus being kept higher than the temperature of the collecting liquid, and after the generated gas is collected, the temperatures of the disk apparatus and the collector liquid are lowered with the temperature of the disk apparatus being kept higher than the temperature of the collector liquid.

3. The gas collecting method according to claim 1, wherein the collecting liquid is selected from the group consisting of pure water, an acidic solution, an alkaline solution and an organic solvent.

4. The gas collecting method according to claim 1, wherein the disk apparatus is arranged above the collector liquid within the collecting container under the state that an opened portion of the disk apparatus faces downward.

5. A gas collecting apparatus for collecting the gas generated from a disk apparatus, comprising:

a hermetically sealed collecting container housing a disk apparatus having an open inner structure and a collector liquid; and a heating mechanism configured to heat the disk apparatus and the collector liquid to a certain collecting temperature so as to permit a gas to be generated from the disk apparatus and to evaporate the collector liquid, the vapor of the collector liquid being brought into contact with the disk apparatus to collect the gas generated from the disk apparatus, the heating mechanism including a constant temperature bath for heating or cooling the entire collecting container;

the collecting container including a partition plate movable between a partitioning position for partitioning the inner space of the collecting container into a first region in which is arranged the disk apparatus and a second region in which is arranged the collector liquid and a release position at which the partitioning between the first and second regions is released, the partition plate being moved to the partitioning position when the disk apparatus and the collector liquid are heated or cooled and being moved to the release position when the vapor of the collector liquid collects the gas generated from the disk apparatus.

6. The gas collecting apparatus according to claim 5, wherein the heating mechanism includes a first heating section for heating the disk apparatus, a second heating section for heating the collector liquid, and a control section for controlling the heating temperatures of the first and second heating sections such that the disk apparatus and the collector liquid are heated to the collecting temperature under the state that the temperature of the disk apparatus is kept higher than the temperature of the collector liquid and, after the gas generated from the disk apparatus is collected by the vapor of the collector liquid, the temperatures of the disk apparatus and the collector liquid are lowered under the state that the temperature of the disk apparatus is kept higher than the temperature of the collector liquid.

7. The gas collecting apparatus according to claim 5, wherein the collecting container includes a mounting section configured to hold the disk apparatus above the collector liquid within the collecting container under the state that an opened portion of the disk apparatus faces downward.

* * * * *